US010891680B1

(12) United States Patent
Bowman et al.

(10) Patent No.: US 10,891,680 B1
(45) Date of Patent: Jan. 12, 2021

(54) PRODUCT PURCHASE GUIDANCE SYSTEM AND RELATED METHODS

(71) Applicant: INMAR CLEARING, INC., Winston-Salem, NC (US)

(72) Inventors: Jacob Bowman, High Point, NC (US); Melissa Bube, High Point, NC (US); Joel Corra, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 158 days.

(21) Appl. No.: 16/155,056

(22) Filed: Oct. 9, 2018

(51) Int. Cl.
*G06Q 30/06* (2012.01)
*G06Q 30/02* (2012.01)
*H04W 4/029* (2018.01)

(52) U.S. Cl.
CPC ..... *G06Q 30/0631* (2013.01); *G06Q 30/0207* (2013.01); *G06Q 30/0259* (2013.01); *G06Q 30/0261* (2013.01); *G06Q 30/0271* (2013.01); *G06Q 30/0639* (2013.01); *H04W 4/029* (2018.02)

(58) Field of Classification Search
CPC .. G06Q 30/0241–0277; G06Q 30/0601–0643; G06Q 30/08; G06Q 50/01; G06T 1/0007; G06T 7/00; G06T 7/70; G06T 7/97; G06T 2201/00; H04W 4/29; G01C 21/206
See application file for complete search history.

(56) References Cited

U.S. PATENT DOCUMENTS

| 8,615,448 | B1* | 12/2013 | O'Twomney | G06Q 30/0641 |
| | | | | 705/26.44 |
| 2002/0091568 | A1* | 7/2002 | Kraft | G06Q 30/02 |
| | | | | 705/14.58 |
| 2010/0057541 | A1* | 3/2010 | Bonner | G06Q 30/0261 |
| | | | | 705/26.1 |
| 2013/0030915 | A1* | 1/2013 | Statler | G06Q 20/322 |
| | | | | 705/14.54 |

(Continued)

OTHER PUBLICATIONS

The Rise of Social Media Influencer Marketing on Lifestyle Branding: A Case Study of Lucie Fink. Morgan Glucksman. Elon Journal of Undergraduate Research in Communications, vol. 8, No. 2 • Fall 2017 (Year: 2017).*

*Primary Examiner* — William J Allen
(74) *Attorney, Agent, or Firm* — Allen, Dyer, Doppelt + Gilchrist, P.A.

(57) ABSTRACT

A product purchase guidance system may include a user device to permit selection of an influencer. A purchase guidance server may include a memory to store personalized influencer media content of a respective suggested product purchase list associated with each of the influencers and retailer store layouts, and a processor coupled to the memory to determine an identity of the selected influencer from the user device and determine a geographic location of the user device. The processor may also determine a corresponding retailer store layout based upon the geographic location and determine an in-store position of the user device. The processor may also communicate the personalized influencer media content corresponding to the selected influencer and for a given suggested product based upon the determined retailer store layout and in-store position so that the user device outputs the personalized media content for the given suggested product.

27 Claims, 6 Drawing Sheets

(56) References Cited

U.S. PATENT DOCUMENTS

| | | | |
|---|---|---|---|
| 2013/0054698 A1* | 2/2013 | Lee | G06Q 30/0267 |
| | | | 709/204 |
| 2014/0337359 A1* | 11/2014 | Airoldi | G06F 16/24578 |
| | | | 707/748 |
| 2015/0206226 A1* | 7/2015 | Flanagan | G06Q 30/0633 |
| | | | 705/14.51 |
| 2015/0317708 A1* | 11/2015 | Eramian | G06Q 30/0633 |
| | | | 705/26.8 |
| 2016/0071149 A1* | 3/2016 | Farshori | G06Q 30/0267 |
| | | | 705/14.51 |
| 2018/0322523 A1* | 11/2018 | Letson | G06Q 30/0238 |
| 2018/0374128 A1* | 12/2018 | Mao | H04N 5/23206 |

* cited by examiner

US 10,891,680 B1

PRODUCT PURCHASE GUIDANCE SYSTEM AND RELATED METHODS

TECHNICAL FIELD

The present invention relates to the field of electronic recommendation systems, and more particularly, to providing product purchase guidance and related methods.

BACKGROUND

Sales of a particular product or service may be based upon how well that product or service is marketed to a consumer. One form of marketing is called influencer marketing. Influencer marketing enables a brand, for example, to connect with potential customers.

Bloggers, for example, may be considered one type of highly regarded influencer. In many instances, a consumer may trust an influencer, such as a blogger, over other types of content, for example, brand content. An influencer may address the shortcomings of brand content or a typical marketing campaign by using the influencer's media reach to educate consumers on the given product and/or provide positive feedback about the given product.

Another form of marketing is an offer, for example, a coupon or rebate, typically in paper form, for a discount toward the product or service. Some offers may be retailer specific, for example, only redeemable for the discount at a particular retailer, while other offers may be product specific from a manufacturer and redeemable at any retailer.

A coupon or rebate, for example, while typically in paper form, may be in digital form and may be referred to as a digital promotion or offer. A digital promotion may be selected or "clipped" via a mobile phone and saved to a digital wallet for redemption at a point-of-sale (POS) terminal, for example, or post-transaction. A typical coupon or rebate is applicable to a given product and has a redeemable value that may vary based upon the quantity of a given item, for example, brand of item, size of the product in terms of packaging, and/or the price point of the given item. A typical coupon or rebate may also be redeemable only at a given retailer and/or within a threshold time period.

SUMMARY

A product purchase guidance system may include a user device configured to permit selection of an influencer from among a plurality thereof. The product purchase guidance system may also include a purchase guidance server that includes a memory configured to store personalized influencer media content of a respective suggested product purchase list associated with each of the plurality of influencers and a plurality of retailer store layouts. The product purchase guidance system may also include a processor coupled to the memory and configured to determine an identity of the selected influencer from the user device and determine a geographic location of the user device. The processor may also determine a corresponding retailer store layout based upon the geographic location of the user device and determine an in-store position of the user device. The processor may further communicate the personalized influencer media content corresponding to the selected influencer and for a given suggested product from the respective suggested product purchase list based upon the determined retailer store and in-store position so that the user device outputs the personalized media content for the given suggested product.

The processor may be configured to communicate the personalized media content for a next suggested product from the respective suggested product purchase list. Personalized media content may include personalized audio content, for example. Personalized media content may include personalized video content, for example.

The user device may include a camera. The processor may be configured to determine the in-store position of the user device based upon the camera, for example.

The processor may be configured to communicate a notification to the user device that the user device is adjacent the given suggested product based upon the in-store position. The processor may be configured to generate a digital promotion for the given product, for example.

The memory may be configured to store personalized influencer media content of at least one alternative product to a product on the suggested product purchase list. The processor may be configured to communicate the personalized influencer media content for the at least one alternative product to the given suggested product so that the user device outputs the personalized media content for the at least one alternative product, for example. The processor may be configured to generate a digital promotion for the at least one alternative product, for example.

A method aspect is directed to a method of providing purchase guidance. The method may include using a processor coupled to a memory to determine an identity of a selected influencer from a user device configured to permit selection of an influencer from among a plurality thereof. The method may also include using the processor to determine a geographic location of the user device and determine a corresponding retailer store layout from a plurality thereof stored in the memory based upon the geographic location of the user device. The method may also include using the processor to determine an in-store position of the user device and communicate personalized influencer media content stored in the memory corresponding to the selected influencer from the plurality thereof and for a given suggested product from a respective suggested product purchase list stored in the memory based upon the determined retailer store layout and in-store position so that the user device outputs the personalized media content for the given suggested product.

A computer readable medium aspect is directed to a non-transitory computer readable medium for a purchase guidance server. The non-transitory computer readable medium includes computer executable instructions that when executed by a processor of the purchase guidance server cause the processor to perform operations. The operations may include determining an identity of a selected influencer from a user device configured to permit selection of an influencer from among a plurality thereof and determining a geographic location of the user device. The operations may also include determining a corresponding retailer store layout from a plurality thereof stored in a memory coupled to the processor based upon the geographic location of the user device. The operations may further include determining an in-store position of the user device and communicating personalized influencer media content stored in the memory corresponding to the selected influencer from the plurality thereof and for a given suggested product from a respective suggested product purchase list stored in the memory based upon the determined retailer store layout and in-store position so that the user device outputs the personalized media content for the given suggested product.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a product purchase guidance system 20 includes a user device 30. The user device 30 is illustratively in the form of a mobile wireless communications device, such as, for example, a mobile or smart phone. The user device 30 may be another type of device, for example, a personal computer either wired or wireless, a tablet computer, and/or a wearable device. Of course the user device 30 may be another type of device as will be appreciated by those skilled in the art.

Figure 1:
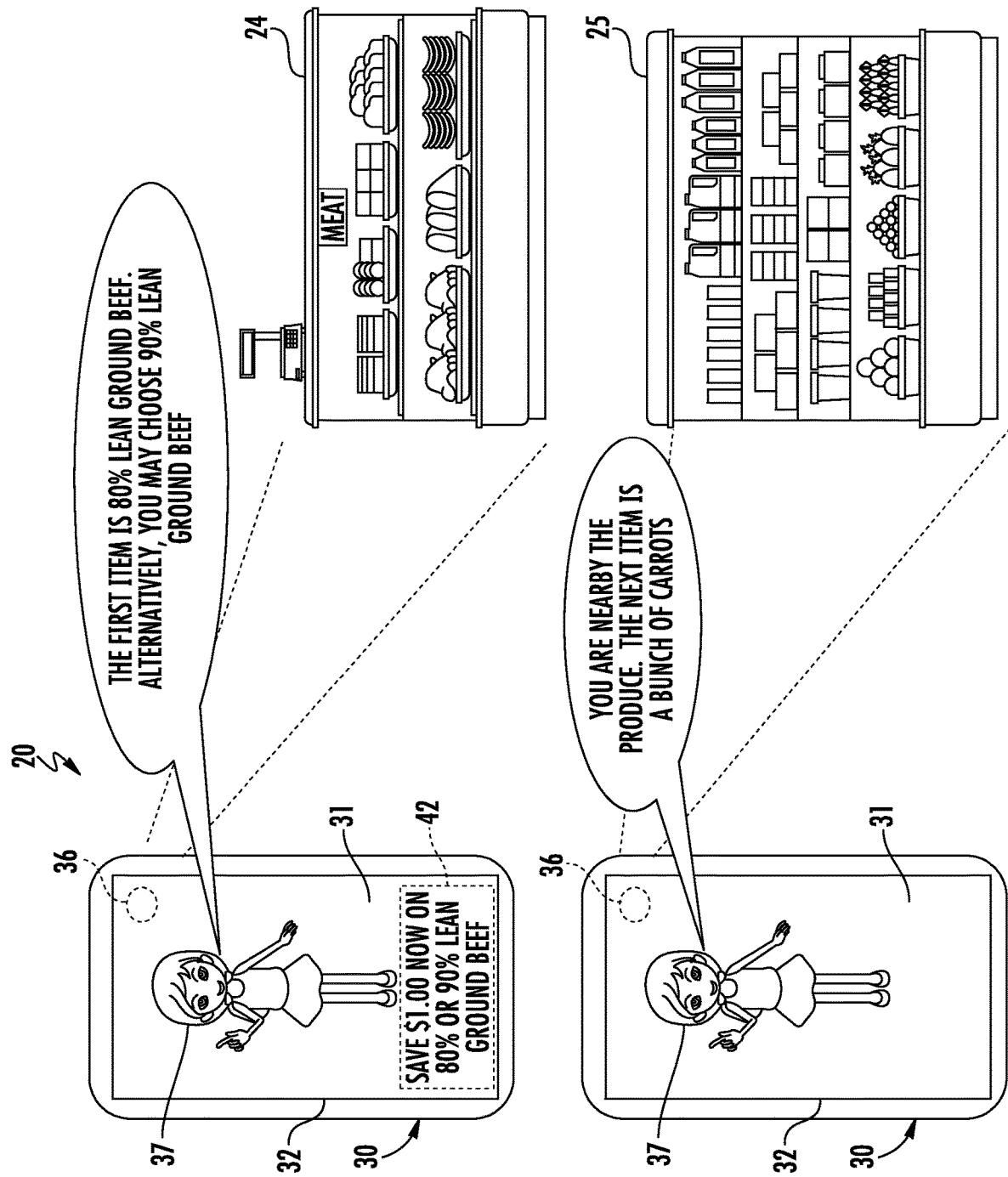
FIG. 1 is a schematic diagram of a product purchase guidance system in accordance with an embodiment.
Figure 2:
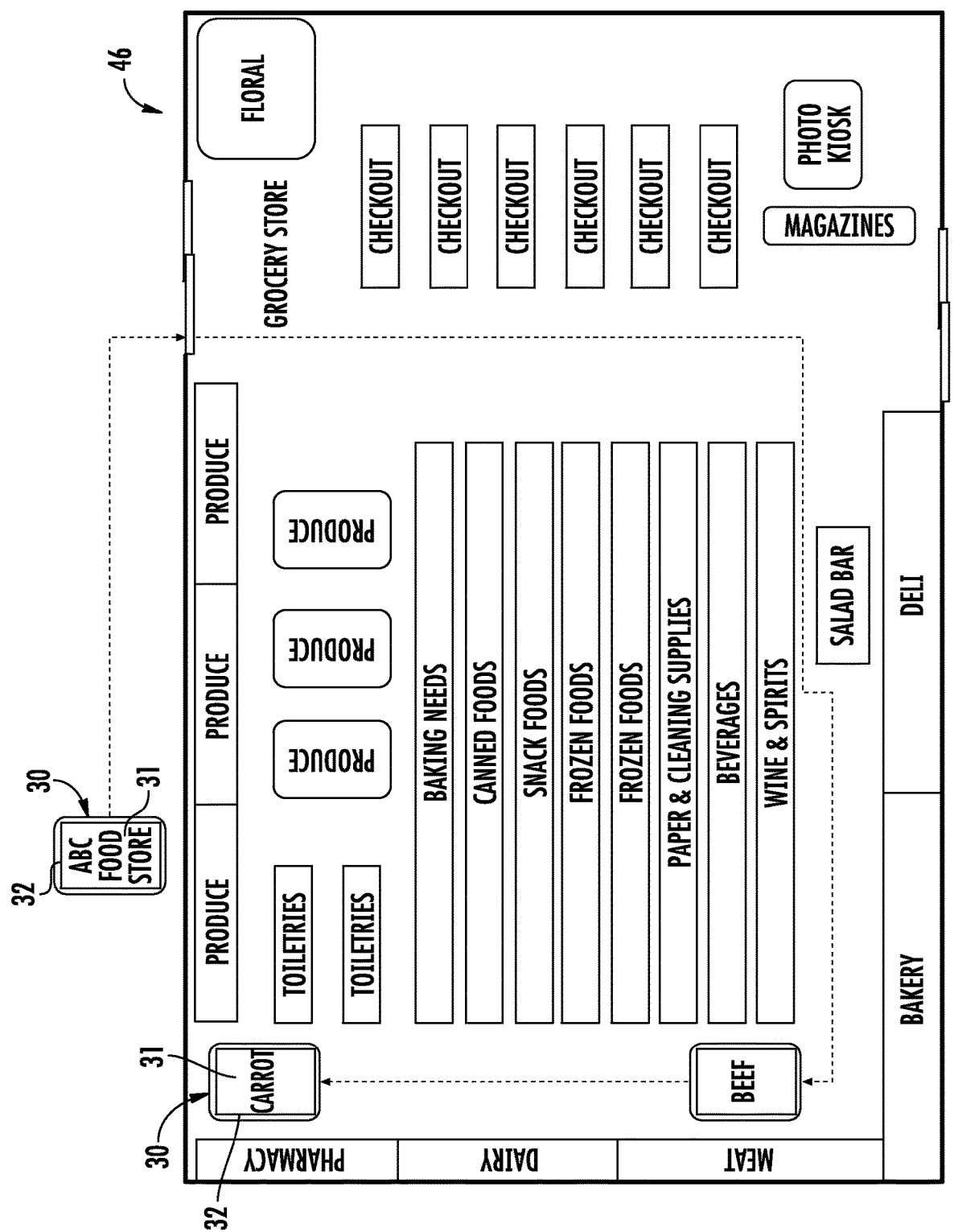
FIG. 2 is another schematic diagram of a product purchase guidance system in accordance with an embodiment.
Figure 3:
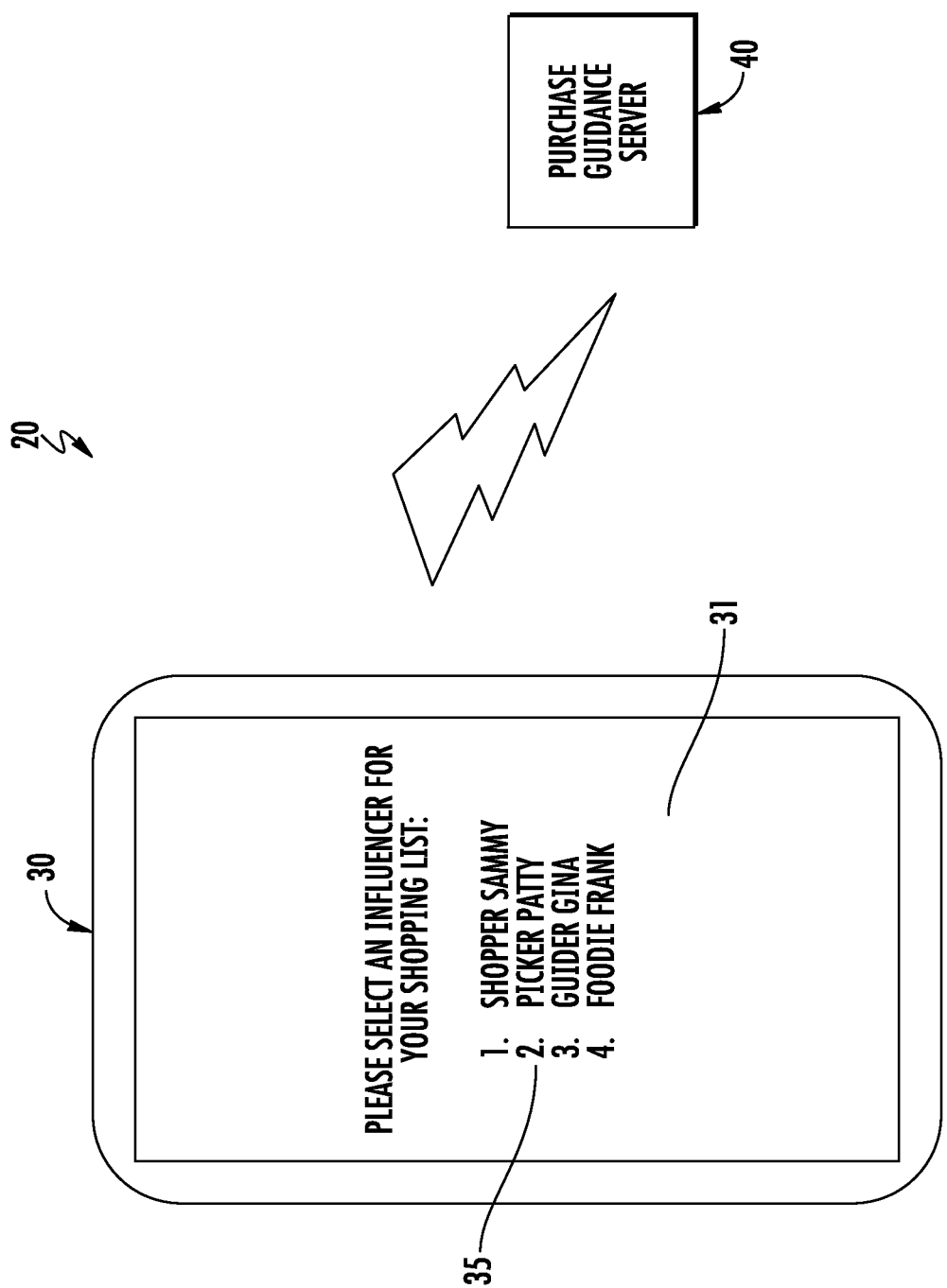
FIG. 3 is another schematic diagram of a product purchase guidance system in accordance with an embodiment.
Figure 4:
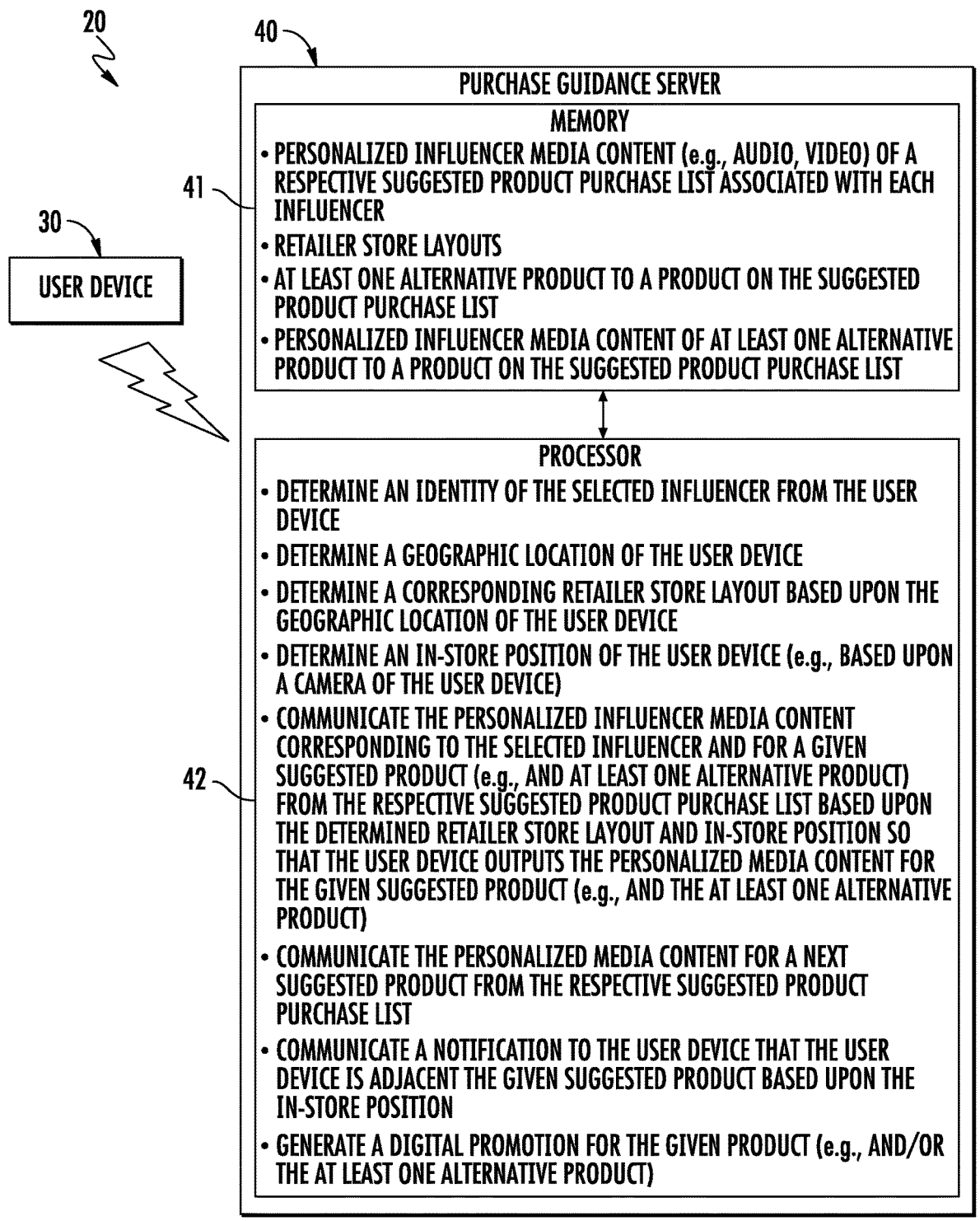
FIG. 4 is a more detailed schematic block diagram of a server of a purchase guidance system in accordance with an embodiment.

The user device 30 includes an input device 31, for example, a pushbutton, touch display, keyboard, etc. that permits selection of an influencer 37 from among a list of influencers 35 (FIG. 3). An influencer may be considered anyone that has a relatively large social following, for example, on one or more social media platforms. The influencers may have users "following," "liking," or "friending" them. The amount of influence a given influencer has (e.g., to be determined to be an influencer) may be determined based upon the followers, likes, or friends, for example. An influencer may also be paid, for example, to publish content about a product or service.

The influencers 35, for example, their names or social media aliases may be displayed on a display 32 of the user device. The user associated with the user device 30 may have a particular interest in a given influencer 37 and, accordingly, may select that influencer from the list of influencers on the display 32. In some embodiments, the user device 30 may also include a camera 36.

The product purchase guidance system 20 also includes a purchase guidance server 40. The purchase guidance server 40 includes a memory 41 that stores personalized influencer media content of a respective suggested product purchase list associated with each of the influencers 35. For example, the personalized influencer media content may include personalized audio content (e.g., voice of the influencer) and/or video content (e.g., a video of the influencer speaking). In an example embodiment, the products may include groceries to be purchased at a grocery store, and the list of products may be a grocery list for a week's worth of groceries curated by the corresponding influencer 37.

The memory 41 also stores retailer store layouts 46. In other words, the memory 41 stores aisle layouts and the location or geographic position of the product relative to aisles and location on shelves, display cases, freezers, etc. within the corresponding retailer store. The purchase guidance server 40 also includes a processor 42 coupled to the memory 41.

Figure 5A:
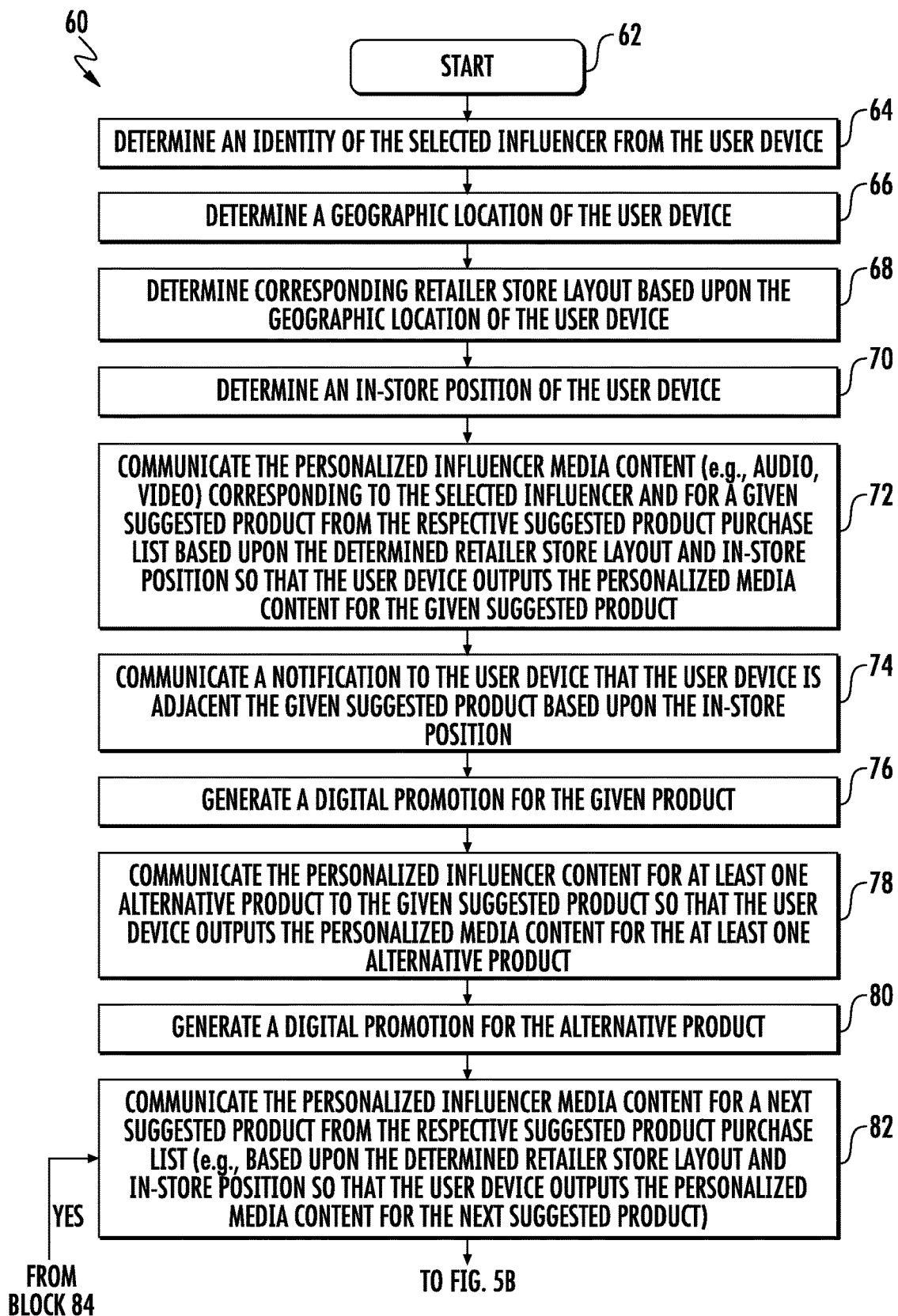
FIGS. 5a and 5b are a flowchart of operation of a purchase guidance system in accordance with an embodiment.
Figure 5B:
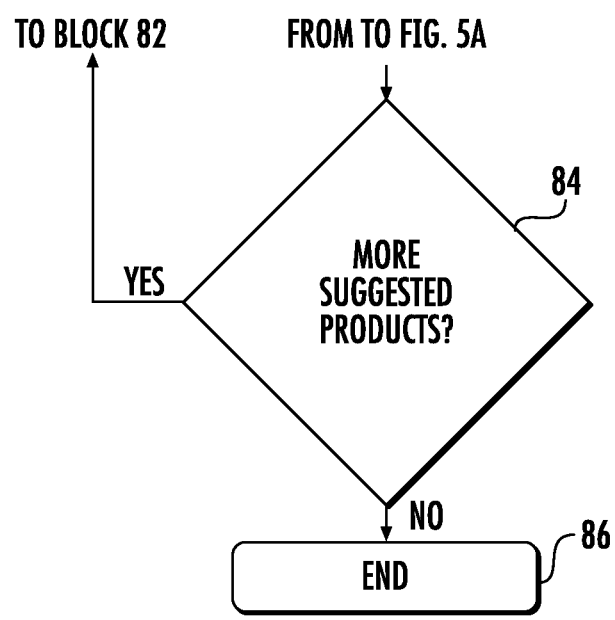

Referring now additionally to the flowchart 60 in FIGS. 5a and 5b, beginning at Block 62, operations of the purchase guidance server 40 with respect to providing purchase guidance will now be described. It should be understood that the operations described herein with respect to the purchase guidance server 40 are performed based upon cooperation between the processor 42 and the memory 41.

At Block 64, the purchase guidance server 40 determines an identity of the selected influencer from the user device 30. For example, the user device 30 may communicate the selected influencer 37 from the list of influencers 35 to the purchase guidance server 40. Communication between the user device 30 and the purchase guidance server 40 may be via one or more wired and/or wireless networks, for example, the Internet.

The purchase guidance server 40, at Block 66, determines a geographic location of the user device 30. The purchase guidance server 40 may determine the geographic location of the user device 30 based upon cellular towers in communication with the user device, global positioning system (GPS) data communicated from the user device, and/or network identifiers in communication with the user device. Of course, other techniques and methods for determining the geographic location of the user device may be used.

The purchase guidance server 40 determines a corresponding retailer store layout 46 based upon the geographic location of the user device 30 (Block 68). For example, the user device 30, upon arrival at a retail store, may communicate its geographic location to the purchase guidance server 40. The purchase guidance server 40 may determine that the user device 30 is at or adjacent the retail store and based thereon, the purchase guidance server may determine or load the corresponding retailer store layout 46.

The purchase guidance server 40 determines an in-store position of the user device 30 at Block 70. For example, the purchase guidance server 40 may determine that the user device 30 is adjacent the ground beef section or meat section of the retailer store based upon respective images 24, 25 from the device camera 36. When the user device 30, along with the user, moves within the retailer stores, the purchase guidance server 40 may update the in-store position. The in-store position may be determined by any number of geolocation techniques, for example, network signal strength (WiFi, cellular), beacons, triangulation, etc. The in-store position may also be determined based upon the camera 36 of the user device 30. More particularly, images 24, 25 acquired by the camera 36 may be communicated to the purchase guidance server 40 for comparison and image recognition. For example, based upon images 24, 25 acquired by the camera 36 (e.g., of signs, products, product packaging, etc.), the purchase guidance server 40 may determine where the user device 30 is positioned within the store. Of course, other and/or additional techniques for determining the in-store position may be used.

At Block 72, the purchase guidance server 40 communicates the personalized influencer media content corresponding to the selected influencer 37 and for a given suggested product from the respective suggested product purchase list based upon the determined retailer store layout 46 and in-store position. More particularly, the purchase guidance server 40 may communicate, for example, by way of a video with audio of the selected influencer 37, a given suggested product to the user. For example, if 80% lean ground beef is on the product purchase list corresponding to the selected influencer 37, the given influencer may, by way of video being played on the user device 30, mention that "A first item on our list is 1-pound of 80% lean ground beef." It should be appreciated that the purchase guidance server 40 may communicate a segment of overall personalized influencer media content (e.g., a video segment) that corresponds to each suggested product. Moreover, the suggested product purchase list may be different for each influencer 35.

At Block 74, in some embodiments, the purchase guidance server 40 may communicate a notification to the user device 30 is adjacent a given suggested product from the respective suggested product purchase list, for example, based upon the determined retailer store layout and in-store position. The notification may be a notification on the display 32 of the user device 30 and/or in the form of the personalized influencer media content (e.g., spoken audio, and/or video) corresponding to the selected influencer 37. For example, with respect to the 80% lean ground beef, the purchase guidance server 40 may communicate a notification that the user, via the user device 30, is adjacent the ground beef section based upon the in-store position. In some embodiments, the purchase guidance server 40 may communicate the notification prior to communicating the personalized influencer media content.

At Block 76, the purchase guidance server 40 may generate a digital promotion 42 for the given product. In some embodiments, the digital promotion 42 may be generated by another server than the purchase guidance server 40. For example, with respect to the 80% lean ground beef, the purchase guidance server 40 may generate a digital coupon 42 for a $1.00 off. The digital coupon 42 may be communicated to the user device 30 for display and/or storage in a digital wallet for subsequent redemption at a point-of-sale (POS) terminal, for example, within the retailer store. In some embodiments, the digital promotion may be in form of a rebate for post-purchase redemption. Moreover, the purchase guidance server 40 may generate the digital promotion for some suggested products from the suggested product purchase list or no products at all.

In some embodiments, the purchase guidance server 40 may store, for example in the memory 41, personalized influencer media content of one or more alternative products to a product on the suggested product purchase list. The purchase guidance server 40 may thus communicate the personalized influencer media content for the alternative product or products to the given suggested product so that the user device 30 outputs the personalized media content for the alternative product (Block 78). At Block 80, the purchase guidance server 40 may generate (and communicate) a digital promotion 42 for the alternative product or products. With respect to the ground beef example, the purchase guidance server 40 may communicate the personalized media content for 90% lean ground beef instead of 80% lean ground beef, and may generate a digital promotion 42 for the 90% lean ground beef. In some embodiments, the purchase guidance server 40 may generate a digital promotion 42 for the alternative product and not the original suggested product and vice versa, or for both the original and alternative products.

The purchase guidance server 40, at Block 82, communicates the personalized media content for a next suggested product from the respective suggested product purchase list. More particularly, the purchase guidance server 40 may communicate personalized audio and/or video content that carrots are the next suggested product from the respective suggested product purchase list. The next suggested product communicated in the personalized media content may be determined based upon the determined retailer store layout 46 and in-store position. For example, if the user is near the ground beef and the further suggested products include carrots and tomato sauce, the purchase guidance server 40 may communicate the personalized media content for the carrots, which are nearby the ground beef. The purchase guidance server 40 may communicate the next suggested product when it is determined that the user and the user device begin to move from the ground beef area within the store.

At Block 84, if there are more products on the respective suggested product list, the process of communicating the personalized media content for next suggested products from the respective suggested product purchase list continues (Block 82). If there are no further suggested products, i.e., products from the suggested product purchase list have been exhausted, the operations end at Block 86. It should be understood by those skilled in the art, that a digital promotion 42 may also be generated for any one or more of the next suggested products.

As will be appreciated by those skilled in the art, the product purchase guidance system 20 may advantageously provide targeted purchase recommendations (e.g., a promoted and/or alternative product) for desired products using an influencer and, in some embodiments, a digital promotion 42. Moreover, rather than static content, for example, written words, the product purchase guidance system 20 provides an interactive experience with the user by communicating and causing the output of the personalized content of a product list (e.g., audio and/or video) based upon the in-store position and the retailer store layout 46 and corresponding to the selected influencer 37. Image acquisition and recognition may also advantageously be used to determine in-store position and be a basis for communicating the influencer content (e.g., matching suggested product to location).

A method aspect is directed to a method of providing purchase guidance. The method includes using a processor 42 coupled to a memory 41 to determine an identity of a selected influencer 37 from a user device 30 configured to permit selection of an influencer from among a plurality thereof. The method may also include using the processor 42 to determine a geographic location of the user device 30 and determine a corresponding retailer store layout 46 from a plurality thereof stored in the memory 41 based upon the geographic location of the user device. The method may also include using the processor 42 to determine an in-store position of the user device 30 and communicate personalized influencer media content stored in the memory 41 corresponding to the selected influencer 37 from the plurality thereof and for a given suggested product from a respective suggested product purchase list stored in the memory based upon the determined retailer store layout 46 and in-store position so that the user device outputs the personalized media content for the given suggested product.

A computer readable medium aspect is directed to a non-transitory computer readable medium for a purchase guidance server 40. The non-transitory computer readable medium includes computer executable instructions that when executed by a processor 42 of the purchase guidance server 40 cause the processor to perform operations. The operations may include determining an identity of a selected influencer 37 from a user device 30 configured to permit selection of an influencer from among a plurality thereof and determining a geographic location of the user device. The operations may also include determining a corresponding retailer store layout 46 from a plurality thereof stored in a memory 41 coupled to the processor 42 based upon the geographic location of the user device 30. The operations may further include determining an in-store position of the user device 30 and communicating personalized influencer media content stored in the memory 41 corresponding to the selected influencer 37 from the plurality thereof and for a given suggested product from a respective suggested product purchase list stored in the memory based upon the determined retailer store layout 46 and in-store position so that the user device 30 outputs the personalized media content for the given suggested product.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product purchase guidance system comprising:
   a user device configured to permit selection of a social media influencer from among a plurality thereof, the user device comprising a geographic positioning system receiver and a camera; and
   a purchase guidance server comprising:
      a memory configured to store personalized influencer media content of a respective suggested product purchase list associated with each of the plurality of social media influencers and a plurality of retailer store layouts each associated with a corresponding retailer store, and
      a processor coupled to the memory and configured to:
         determine an identity of the selected social media influencer from the user device,
         determine a geographic location of the user device based upon the geographic positioning system receiver,
         load a corresponding retailer store layout to the user device based upon the determined geographic location of the user device being geographically adjacent the corresponding retailer store,
         receive images from within the corresponding retailer store from the user device, the images acquired from the camera as the user device moves within the retailer store,
         determine an in-store position of the user device based on the acquired images, and
         communicate the personalized influencer media content corresponding to the selected social media influencer and for a given suggested product from the respective suggested product purchase list based upon the determined retailer store layout and in-store position so that the user device outputs the personalized media content for the given suggested product.

2. The product purchase guidance system of claim 1 wherein the processor is configured to communicate the personalized media content for a next suggested product from the respective suggested product purchase list.

3. The product purchase guidance system of claim 1 wherein personalized media content comprises personalized audio content.

4. The product purchase guidance system of claim 1 wherein personalized media content comprises personalized video content.

5. The product purchase guidance system of claim 4 wherein the personalized video content comprises a video of the social media influencer speaking a description of the given suggested product.

6. The product purchase guidance system of claim 1 wherein the processor is configured to communicate a notification to the user device that the user device is adjacent the given suggested product based upon the in-store position.

7. The product purchase guidance system of claim 1 wherein the processor is configured to generate a digital promotion for the given product.

8. The product purchase guidance system of claim 1 wherein the memory is configured to store personalized influencer media content of at least one alternative product to a product on the suggested product purchase list; and wherein the processor is configured to communicate the personalized influencer media content for the at least one alternative product to the given suggested product so that the user device outputs the personalized media content for the at least one alternative product.

9. The product purchase guidance system of claim 8 wherein the processor is configured to generate a digital promotion for the at least one alternative product.

10. A purchase guidance server comprising:
    a memory configured to store personalized influencer media content of a respective suggested product purchase list associated with each of a plurality of social media influencers and a plurality of retailer store layouts each associated with a corresponding retailer store; and
    a processor coupled to the memory and configured to:
       determine an identity of the selected social media influencer from a user device configured to permit selection of an influencer from among the plurality thereof,
       determine a geographic location of the user device based upon a geographic positioning system receiver of the user device,
       load a corresponding retailer store layout to the user device based upon the determined geographic location of the user device being geographically adjacent the corresponding retailer store,
       receive images from within the corresponding retailer store from the user device, the images being acquired from a camera of the user device as the user device moves within the retailer store,
       determine an in-store position of the user device based on the acquired images, and
       communicate the personalized influencer media content corresponding to the selected social media influencer and for a given suggested product from the respective suggested product purchase list based upon the determined retailer store layout and in-store position so that the user device outputs the personalized media content for the given suggested product.

11. The purchase guidance server of claim 10 wherein the processor is configured to communicate the personalized media content for a next suggested product from the respective suggested product purchase list.

12. The purchase guidance server of claim 10 wherein personalized media content comprises personalized audio content.

13. The purchase guidance server of claim 10 wherein personalized media content comprises personalized video content.

14. The purchase guidance server of claim 10 wherein the processor is configured to communicate a notification to the user device that the user device is adjacent the given suggested product based upon the in-store position.

15. The purchase guidance server of claim 10 wherein the processor is configured to generate a digital promotion for the given product.

16. A method of providing purchase guidance comprising: using a processor coupled to a memory to:
- determine an identity of a selected social media influencer from a user device configured to permit selection of an influencer from among a plurality thereof,
- determine a geographic location of the user device based upon a geographic positioning system receiver of the user device,
- load a corresponding retailer store layout to the user device from a plurality of retailer store layouts each associated with a corresponding retailer store and stored in the memory based upon the geographic location of the user device being geographically adjacent the corresponding retailer store,
- receive images from within the corresponding retailer store from the user device, the images acquired from a camera of the user device as the user device moves within the retailer store,
- determine an in-store position of the user device based on the acquired images, and
- communicate personalized influencer media content stored in the memory corresponding to the selected social media influencer from the plurality thereof and for a given suggested product from a respective suggested product purchase list stored in the memory based upon the determined retailer store layout and in-store position so that the user device outputs the personalized media content for the given suggested product.

17. The method of claim 16 wherein using the processor comprises using the processor to communicate the personalized media content for a next suggested product from the respective suggested product purchase list.

18. The method of claim 16 wherein personalized media content comprises personalized audio content.

19. The method of claim 16 wherein personalized media content comprises personalized video content.

20. The method of claim 16 wherein using the processor comprises using the processor to communicate a notification to the user device that the user device is adjacent the given suggested product based upon the in-store position.

21. The method of claim 16 wherein using the processor comprises using the processor to generate a digital promotion for the given product.

22. A non-transitory computer readable medium for a purchase guidance server, the non-transitory computer readable medium comprising computer executable instructions that when executed by a processor of the purchase guidance server cause the processor to perform operations comprising:
- determining an identity of a selected social media influencer from a user device configured to permit selection of an influencer from among a plurality thereof;
- determining a geographic location of the user device based upon a geographic positioning system of the user device;
- loading a corresponding retailer store layout from a plurality of retailer store layouts each associated with a corresponding retailer store and stored in a memory coupled to the processor based upon the geographic location of the user device being geographically adjacent the corresponding retailer store,
- receiving images from within the corresponding retailer store from the user device, the images acquired from a camera as the user device moves within the retailer store;
- determining an in-store position of the user device based on the acquired images; and
- communicating personalized influencer media content stored in the memory corresponding to the selected social media influencer from the plurality thereof and for a given suggested product from a respective suggested product purchase list stored in the memory based upon the determined retailer store layout and in-store position so that the user device outputs the personalized media content for the given suggested product.

23. The non-transitory computer readable medium of claim 22 wherein the operations comprise communicating the personalized media content for a next suggested product from the respective suggested product purchase list.

24. The non-transitory computer readable medium of claim 22 wherein personalized media content comprises personalized audio content.

25. The non-transitory computer readable medium of claim 22 wherein personalized media content comprises personalized video content.

26. The non-transitory computer readable medium of claim 22 wherein the operations comprise communicating a notification to the user device that the user device is adjacent the given suggested product based upon the in-store position.

27. The non-transitory computer readable medium of claim 22 wherein the operations comprise generating a digital promotion for the given product.

* * * * *